(12) United States Patent
Higuchi (10) Patent No.: US 8,349,432 B2
(45) Date of Patent: Jan. 8, 2013

(54) HONEYCOMB STRUCTURE AND METHOD FOR MANUFACTURING HONEYCOMB STRUCTURE

(75) Inventor: Takehiro Higuchi, Ibi-gun (JP)

(73) Assignee: Ibiden Co., Ltd., Ogaki-Shi (JP)

( * ) Notice: Subject to any disclaimer, the term of this patent is extended or adjusted under 35 U.S.C. 154(b) by 827 days.

(21) Appl. No.: 12/400,389

(22) Filed: Mar. 9, 2009

(65) Prior Publication Data
US 2009/0252906 A1    Oct. 8, 2009

(30) Foreign Application Priority Data
Mar. 24, 2008    (WO) ............... PCT/JP2008/055461

(51) Int. Cl.
*B32B 3/12*    (2006.01)
*C04B 35/569*    (2006.01)
*B01D 39/20*    (2006.01)
*C04B 38/06*    (2006.01)

(52) U.S. Cl. ........ 428/116; 55/523; 156/89.22; 264/630

(58) Field of Classification Search .............. None
See application file for complete search history.

(56) References Cited

U.S. PATENT DOCUMENTS

| | | | |
|---|---|---|---|
| 4,743,578 A | 5/1988 | Davidson | |
| 5,914,187 A | 6/1999 | Naruse et al. | |
| 6,669,751 B1 | 12/2003 | Ohno et al. | |
| 6,803,087 B2 * | 10/2004 | Brew et al. | 428/116 |
| 7,112,233 B2 | 9/2006 | Ohno et al. | |
| 7,284,980 B2 | 10/2007 | Saijo et al. | |
| 7,309,370 B2 | 12/2007 | Kudo et al. | |
| 7,332,014 B2 | 2/2008 | Ono et al. | |
| 7,341,614 B2 | 3/2008 | Hayashi et al. | |
| 7,348,049 B2 | 3/2008 | Yoshida | |
| 7,387,829 B2 | 6/2008 | Ohno et al. | |
| 7,393,376 B2 | 7/2008 | Taoka et al. | |
| 7,396,586 B2 | 7/2008 | Ohno et al. | |
| 7,427,308 B2 | 9/2008 | Taoka et al. | |
| 7,427,309 B2 | 9/2008 | Ohno et al. | |
| 7,438,967 B2 | 10/2008 | Fujita | |
| 7,449,427 B2 | 11/2008 | Ohno et al. | |
| 7,462,216 B2 | 12/2008 | Kunieda et al. | |
| 7,473,465 B2 | 1/2009 | Ohno et al. | |
| 7,491,057 B2 | 2/2009 | Saijo et al. | |
| 7,498,544 B2 | 3/2009 | Saijo et al. | |
| 7,504,359 B2 | 3/2009 | Ogyu et al. | |
| 7,520,178 B2 | 4/2009 | Ohno et al. | |
| 7,524,350 B2 | 4/2009 | Kunieda | |

(Continued)

FOREIGN PATENT DOCUMENTS

EP    1666435    6/2006

(Continued)

*Primary Examiner* — David Sample
(74) *Attorney, Agent, or Firm* — Ditthavong Mori & Steiner, P.C.

(57) ABSTRACT

A honeycomb structure includes a ceramic block formed by combining a plurality of honeycomb fired bodies together with an adhesive layer interposed between the plurality of honeycomb fired bodies. The plurality of honeycomb fired bodies each has cell walls extending along a longitudinal direction of the honeycomb fired bodies to define cells. The honeycomb fired bodies adjacent to each other via said adhesive layer each have at least one projected portion on the opposing side faces. The projected portions formed on the honeycomb fired bodies overlap each other when seen from an end face of the honeycomb structure and the projected portions formed on the adjacent honeycomb fired bodies abut each other.

33 Claims, 6 Drawing Sheets

U.S. PATENT DOCUMENTS

| | | |
|---|---|---|
| 7,540,898 B2 | 6/2009 | Oshimi |
| 7,543,513 B2 | 6/2009 | Kobayashi et al. |
| 7,550,026 B2 | 6/2009 | Hayakawa |
| 7,556,666 B2 | 7/2009 | Kunieda |
| 2003/0138596 A1 | 7/2003 | Harada et al. |
| 2004/0081848 A1 | 4/2004 | Hijikata |
| 2004/0108056 A1 | 6/2004 | Fujita et al. |
| 2004/0161596 A1 | 8/2004 | Taoka et al. |
| 2005/0109023 A1 | 5/2005 | Kudo et al. |
| 2005/0153099 A1 | 7/2005 | Yamada |
| 2005/0169819 A1 | 8/2005 | Shibata |
| 2005/0175514 A1 | 8/2005 | Ohno |
| 2005/0180898 A1 | 8/2005 | Yamada |
| 2005/0247038 A1 | 11/2005 | Takahashi |
| 2005/0272602 A1 | 12/2005 | Ninomiya |
| 2006/0029898 A1 | 2/2006 | Saijo et al. |
| 2006/0043652 A1 | 3/2006 | Saijo et al. |
| 2006/0051556 A1 | 3/2006 | Ohno et al. |
| 2006/0073970 A1 | 4/2006 | Yamada |
| 2006/0108347 A1 | 5/2006 | Koyama et al. |
| 2006/0118546 A1 | 6/2006 | Saijo |
| 2006/0210765 A1 | 9/2006 | Ohno et al. |
| 2006/0216466 A1 | 9/2006 | Yoshida |
| 2006/0216467 A1 | 9/2006 | Yoshida |
| 2006/0222812 A1 | 10/2006 | Koyama et al. |
| 2006/0225390 A1 | 10/2006 | Yoshida |
| 2006/0269722 A1 | 11/2006 | Yamada |
| 2007/0020155 A1 | 1/2007 | Ohno et al. |
| 2007/0028575 A1 | 2/2007 | Ohno et al. |
| 2007/0059483 A1 * | 3/2007 | Fujita et al. .................. 428/116 |
| 2007/0068128 A1 | 3/2007 | Oshimi et al. |
| 2007/0085233 A1 | 4/2007 | Yamada |
| 2007/0116908 A1 | 5/2007 | Ohno et al. |
| 2007/0126160 A1 | 6/2007 | Takahashi |
| 2007/0128405 A1 | 6/2007 | Sakaguchi et al. |
| 2007/0130897 A1 | 6/2007 | Sakaguchi et al. |
| 2007/0144561 A1 | 6/2007 | Saijo et al. |
| 2007/0148403 A1 | 6/2007 | Yamamura et al. |
| 2007/0152382 A1 | 7/2007 | Yamada et al. |
| 2007/0175060 A1 | 8/2007 | Idei et al. |
| 2007/0178275 A1 | 8/2007 | Takahashi |
| 2007/0187651 A1 | 8/2007 | Naruse et al. |
| 2007/0190350 A1 | 8/2007 | Ohno et al. |
| 2007/0196620 A1 | 8/2007 | Ohno et al. |
| 2007/0199205 A1 | 8/2007 | Hoshino et al. |
| 2007/0199643 A1 | 8/2007 | Kawai et al. |
| 2007/0212517 A1 | 9/2007 | Ohno et al. |
| 2007/0231536 A1 | 10/2007 | Shionoya |
| 2007/0235895 A1 | 10/2007 | Yamamura et al. |
| 2007/0243283 A1 | 10/2007 | Yamamura et al. |
| 2007/0262497 A1 | 11/2007 | Yamamura et al. |
| 2007/0262498 A1 | 11/2007 | Saijo et al. |
| 2007/0277655 A1 | 12/2007 | Kawai et al. |
| 2007/0293392 A1 | 12/2007 | Ohno et al. |
| 2008/0006971 A1 | 1/2008 | Kawai et al. |
| 2008/0067725 A1 | 3/2008 | Naruse et al. |
| 2008/0084010 A1 | 4/2008 | Naruse et al. |
| 2008/0088072 A1 | 4/2008 | Kobayashi |
| 2008/0106008 A1 | 5/2008 | Kasai et al. |
| 2008/0106009 A1 | 5/2008 | Naruse et al. |
| 2008/0111274 A1 | 5/2008 | Kawai et al. |
| 2008/0116200 A1 | 5/2008 | Kawai et al. |
| 2008/0116601 A1 | 5/2008 | Naruse et al. |
| 2008/0120950 A1 | 5/2008 | Ohno et al. |
| 2008/0136053 A1 | 6/2008 | Kuribayashi et al. |
| 2008/0136062 A1 | 6/2008 | Kasai et al. |
| 2008/0138567 A1 | 6/2008 | Ninomiya et al. |
| 2008/0150200 A1 | 6/2008 | Tajima |
| 2008/0157445 A1 | 7/2008 | Kawai et al. |
| 2008/0160249 A1 | 7/2008 | Makino |
| 2008/0174039 A1 | 7/2008 | Saijo et al. |
| 2008/0179781 A1 | 7/2008 | Iwata |
| 2008/0190081 A1 | 8/2008 | Oshimi |
| 2008/0190083 A1 | 8/2008 | Oshimi |
| 2008/0197544 A1 | 8/2008 | Saijo et al. |
| 2008/0211127 A1 | 9/2008 | Naruse et al. |
| 2008/0213485 A1 | 9/2008 | Shibata |
| 2008/0236115 A1 | 10/2008 | Sakashita |
| 2008/0236122 A1 | 10/2008 | Ito |
| 2008/0236724 A1 | 10/2008 | Higuchi |
| 2008/0237942 A1 | 10/2008 | Takamatsu |
| 2008/0241015 A1 | 10/2008 | Kudo et al. |
| 2008/0241444 A1 | 10/2008 | Oshimi |
| 2008/0241466 A1 | 10/2008 | Saito et al. |
| 2008/0251977 A1 | 10/2008 | Naruse et al. |
| 2008/0284067 A1 | 11/2008 | Naruse et al. |
| 2008/0305259 A1 | 12/2008 | Saijo |
| 2008/0318001 A1 | 12/2008 | Sakakibara |
| 2009/0004431 A1 | 1/2009 | Ninomiya |
| 2009/0079111 A1 | 3/2009 | Kasai et al. |
| 2009/0107879 A1 | 4/2009 | Otsuka et al. |
| 2009/0130378 A1 | 5/2009 | Imaeda et al. |

FOREIGN PATENT DOCUMENTS

| | | |
|---|---|---|
| EP | 1736221 | 12/2006 |
| EP | 1767508 | 3/2007 |
| EP | 1854773 | 11/2007 |
| EP | 1884275 | 2/2008 |
| JP | 62-114658 | 5/1987 |
| JP | 2000-279729 | 10/2000 |
| JP | 2002-253916 | 9/2002 |
| JP | 2004-262669 | 9/2004 |
| JP | 2007-260530 | 10/2007 |
| WO | 2002-282634 | 10/2002 |
| WO | WO 03/031371 | 4/2003 |
| WO | WO 2006/082940 | 8/2006 |
| WO | WO 2006/093231 | 9/2006 |
| WO | 2006/126507 | 11/2006 |

* cited by examiner

A-A line cross-sectional view

FIG. 10

HONEYCOMB STRUCTURE AND METHOD FOR MANUFACTURING HONEYCOMB STRUCTURE

CROSS-REFERENCE TO RELATED APPLICATIONS

The present application claims priority under 35 U.S.C. §119 to PCT Application No. PCT/JP2008/055461, filed Mar. 24, 2008, the contents of which are incorporated herein by reference in their entirety.

BACKGROUND OF THE INVENTION

1. Field of the Invention

The present invention relates to a honeycomb structure and a method for manufacturing the honeycomb structure.

2. Discussion of the Background

Exhaust gases discharged from internal combustion engines such as diesel engines contain particulate matters (also termed PM hereafter) and possible adverse effects of the PM on environments and human bodies are a current issue.

Then, a variety of honeycomb filters using a honeycomb structure including silicon carbide and the like have been proposed as an exhaust gas filter for collecting the PM in exhaust gases and purifying the exhaust gases.

After collecting a certain amount of PM, the above-mentioned honeycomb structure undergoes a regenerating process in which the honeycomb structure is heated to a high temperature (about 600° C. to about 1000° C.) to burn the collected PM. Here, the PM tends to deposit unevenly in the longitudinal direction of the honeycomb structure forming the honeycomb filter. This causes temperature differences along the longitudinal direction of the honeycomb structure as the PM burns. Consequently, the honeycomb structure undergoes thermal stress. Particularly, in the honeycomb structure obtained by bonding a plurality of honeycomb fired bodies using an adhesive layer, the thermal stress may impose a load on the adhesive layer and cause cracks of the adhesive layer.

When the cracks develop extensively through the adhesive layer as a result of further regenerating processes or vibrations during the driving, the adhesive strength between honeycomb fired bodies is lowered, whereby some honeycomb fired bodies may be displaced or even some honeycomb fired bodies may come off in an extreme case. The displacement or coming off of the honeycomb fired body may cause exhaust gas leakage.

In order to prevent any displacement or coming off of the honeycomb fired bodies, a honeycomb structure of which the honeycomb fired bodies have fine recessed and projected portions on their peripheral face to improve the adhesive strength to the adhesive layer has been proposed (JP-A 2000-279729).

The contents of JP-A 2000-279729 are incorporated herein by reference in their entirety.

SUMMARY OF THE INVENTION

According to one aspect of the present invention, a honeycomb structure includes a ceramic block formed by combining a plurality of honeycomb fired bodies together with an adhesive layer interposed between the plurality of honeycomb fired bodies. Each of the plurality of honeycomb fired bodies has cell walls extending along a longitudinal direction of the honeycomb fired bodies to define cells. The honeycomb fired bodies adjacent to each other via the adhesive layer each have at least one projected portion on the opposing side faces. The projected portions formed on the honeycomb fired bodies overlap each other when seen from an end face of the honeycomb structure and the projected portions formed on the adjacent honeycomb fired bodies abut each other.

According to another aspect of the present invention, a method for manufacturing a honeycomb structure includes molding a ceramic raw material to manufacture honeycomb molded bodies. Each of the honeycomb molded bodies has cell walls extending along a longitudinal direction of the honeycomb fired bodies to define cells. The honeycomb molded bodies are fired to manufacture honeycomb fired bodies. A plurality of the honeycomb fired bodies are bonded together with a paste for an adhesive layer interposed between the honeycomb fired bodies to form a ceramic block. A projected portion is formed on each of side faces of one piece of the honeycomb molded bodies and another piece of the honeycomb molded bodies in a manner that the projected portions formed on the honeycomb fired bodies overlap each other when seen from an end face of the honeycomb structure and the projected portions formed on the adjacent honeycomb fired bodies abut each other.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Embodiments will now be described with reference to the accompanying drawings, wherein like reference numerals designate corresponding or identical elements throughout the various drawings.

A honeycomb structure according to an embodiment of the present invention includes a ceramic block formed by combining a plurality of honeycomb fired bodies having a large number of cells separated by cell walls and longitudinally extending in parallel together by interposing an adhesive layer, wherein the honeycomb fired bodies adjacent to each other by interposing the adhesive layer each have at least one projected portion on the opposing side faces, and the projected portions formed on the honeycomb fired bodies overlap each other when seen from an end face of the honeycomb structure and the projected portions formed on the adjacent honeycomb fired bodies abut each other.

The language "when seen from an end face" means seeing through projected portions at different positions in the direction parallel to the longitudinal direction from an end face.

Then, when the cracks develop in the adhesive layer, lower the adhesive strength, and cause the honeycomb fired bodies to move, the adjacent projected portions formed on the side faces of the honeycomb fired bodies engage each other and are more likely to prevent the honeycomb fired bodies from moving. In this way, any displacement or coming off of the honeycomb fired bodies is more easily prevented. Particularly, in a large honeycomb structure on which displacement of the honeycomb fired bodies in the center portion has a large impact, the projected portions on adjacent honeycomb fired bodies are more likely to surely prevent any displacement or coming off of the honeycomb fired bodies.

In the honeycomb structure according to an embodiment of the present invention, it is desirable that one of the adjacent honeycomb fired bodies has a first projected portion on a side face, the other honeycomb fired body has a first projected portion and a second projected portion on a side face, and the projected portions are formed in a manner that the first projected portion formed on the side face of the one honeycomb fired body is formed between the first and second projected portions formed on the side face of the other honeycomb fired body and the first projected portion formed on the side face of the one honeycomb fired body and the first and second projected portions formed on the side face of the other honeycomb fired body abut each other.

Also in this case, the adjacent projected portions formed on the side faces of the honeycomb fired bodies are more likely to prevent any longitudinal movement of the honeycomb fired bodies. Therefore, even when the cracks develop in the adhesive layer because of thermal stress generated during the regenerating process, any displacement or coming off of the honeycomb fired bodies is more easily prevented. Particularly, in the embodiment of the present invention, a projected portion of one honeycomb fired body and a first projected portion and a second projected portion of another honeycomb fired body are formed as though they were recessed and projected portions fitting each other. In this way, it becomes easier to more reliably prevent any longitudinal displacement or coming off of the honeycomb fired bodies.

In the honeycomb structure according to an embodiment of the present invention, a thickness of cell walls of the periphery of the honeycomb fired bodies may be substantially the same as a thickness of cell walls other than the cell walls of the periphery. In order to form a projected portion on a side face of a honeycomb fired body in this case, a plate body formed using substantially the same material as the forming material of the honeycomb fired body can be attached to the side face of the honeycomb fired body to form a projected portion.

In the honeycomb structure according to an embodiment of the present invention, a thickness of cell walls of the periphery of the honeycomb fired bodies may be larger than a thickness of cell walls other than the cell walls of the periphery.

When the peripheral cell wall has a larger thickness than the inner cell wall, for example, a projected portion is more easily formed by cutting the peripheral cell wall after the honeycomb molded body is dried. The projected portion formed in this way can be a projected portion integrated with the honeycomb fired body after the subsequent firing process.

In the honeycomb structure according to an embodiment of the present invention, a peripheral coat layer may be formed around the periphery of the ceramic block.

A method for manufacturing a honeycomb structure according to an embodiment of the present invention includes: molding a ceramic raw material to manufacture a honeycomb molded body having a large number of cells separated by cell walls and longitudinally extending in parallel; firing the honeycomb molded body to manufacture a honeycomb fired body; and bonding a plurality of the honeycomb fired bodies together by interposing a paste for an adhesive layer to form a ceramic block, the method further including forming a projected portion on each of the side faces of one piece of the honeycomb molded bodies and an other piece of the honeycomb molded bodies in a manner that the projected portions formed on the honeycomb fired bodies overlap each other when seen from an end face of the honeycomb structure and the projected portions formed on the adjacent honeycomb fired bodies abut each other.

The honeycomb molded body is still relatively easily processed because the forming material has not been sintered. A projected portion is formed on this honeycomb molded body, and thereby it becomes easier to efficiently manufacture a honeycomb fired body having a predetermined projected portion.

In the method for manufacturing a honeycomb structure according to an embodiment of the present invention, it is desirable that one of the honeycomb fired bodies has a first projected portion on a side face, the other honeycomb fired body has a first projected portion and a second projected portion on a side face, and the projected portions are formed in a manner that the first projected portion formed on the side face of the one honeycomb fired body is formed between the first and second projected portions formed on the side face of the other honeycomb fired body and the first projected portion formed on the side face of the one honeycomb fired body and the first and second projected portions formed on the side face of the other honeycomb fired body abut each other.

In this way, recessed and projected portions are more easily formed on a side face of a honeycomb fired body in the manner that a projected portion formed on a side face of one honeycomb fired body is just fitted in between a first projected portion and a second projected portion formed on a side face of another honeycomb fired body. When the honeycomb fired bodies manufactured as described above are used to manufacture a honeycomb structure body, any longitudinal displacement of the honeycomb fired bodies is more easily prevented.

In the method for manufacturing a honeycomb structure according to an embodiment of the present invention, the method may include: applying a paste for a peripheral coat layer around the periphery of the ceramic block, drying, and solidifying the paste to form a peripheral coat layer.

In the method for manufacturing a honeycomb structure according to an embodiment of the present invention, in the projected portion formation, a plate body may be placed on a side face of the honeycomb molded body, which is followed by the firing to form a projected portion on the side face of the honeycomb fired body.

A projected portion is more easily formed on a honeycomb fired body by firing a plate body placed on a side face of a honeycomb molded body. The plate body is formed in the firing process; sintering reaction occurs between the honeycomb fired body and the plate body and integrates them. Therefore, the chance of peeling of the plate body forming a projected portion from the honeycomb fired body, and the like, is more likely to be reduced and a honeycomb structure having the projected portions more likely to engage each other over a prolonged period of time is more easily manufactured.

In the method for manufacturing a honeycomb structure according to an embodiment of the present invention, the plate body may include either a molded body or a fired body manufactured by using substantially the same material as a material of a raw material paste, the paste for an adhesive layer, or a paste for a peripheral coat layer.

When the material of the plate body is the above described materials, it is substantially the same material as the forming material of the honeycomb molded body or honeycomb fired body. After the plate body is placed on a side face and fired, they are more easily integrated and have an excellent strength against stress from displacement. In this way, a honeycomb structure more likely to prevent any displacement of the honeycomb fired bodies over a prolonged period of time is more easily manufactured.

The plate body may be placed by interposing a paste in the method for manufacturing a honeycomb structure according to an embodiment of the present invention. In this case, the plate body is more easily placed on a side face of a honeycomb molded body or honeycomb fired body regardless of the state (not sintered, sintered, or the like) of the plate body.

In the above method for manufacturing a honeycomb structure, it is desirable that the paste is substantially the same material as the material of a raw material paste, the paste for an adhesive layer, or a paste for a peripheral coat layer.

In the method for manufacturing a honeycomb structure according to an embodiment of the present invention, it is desirable that projected portions are formed on the side faces of the honeycomb molded body using a paste in the projected portion formation, and then, the firing is carried out to form projected portions on the side faces of the honeycomb fired body.

In the above method for manufacturing a honeycomb structure, it is desirable that the paste is substantially the same material as the material of the raw material paste, the paste for an adhesive layer, or a paste for a peripheral coat layer.

When the forming material of the honeycomb structure is applied and subsequently fired to form a projected portion, sintering reaction occurs between the applied forming material and the honeycomb molded body, whereby the obtained projected portion is more easily integrated with the honeycomb fired body. This projected portion is a part of the honeycomb fired body, and thus tends to be strong against stress generated while the projected portions engage each other. Therefore, a honeycomb structure more likely to prevent any damage to the projected portions or any displacement of the honeycomb fired bodies over a prolonged period of time is more easily manufactured.

In the method for manufacturing a honeycomb structure, it is desirable that the material of the paste is substantially the same as a material of the raw material paste, the paste for an adhesive layer, or the paste for a peripheral coat layer.

In the method for manufacturing a honeycomb structure according to an embodiment of the present invention, the projected portions may be formed by cutting the side faces of the honeycomb molded body in the projected portion formation.

Since the projected portion is formed on the honeycomb molded body that is easy to cut, a honeycomb fired body having a projected portion is more easily manufactured in a simpler and productive manner. The projected portions overlapping each other when seen from an end face thereof and abutting each other can be integrated with the honeycomb fired body and become a part of the honeycomb fired body, thereby tending to become highly strong against stress generated upon displacement. Therefore, a honeycomb structure in which displacement or coming off of the honeycomb fired bodies hardly occurs over a prolonged period of time is more easily manufactured.

Although the conventional honeycomb structure described in JP-A 2000-279729 has an improved adhesive strength, some honeycomb fired bodies, particularly those located in the center portion, may occasionally be displaced or come off. This tendency is particularly apparent in a large honeycomb structure having a higher ratio of the exhaust gas inlet face area to the total length than that of the prior art because the honeycomb fired bodies around the center portion are bonded by interposing many adhesive layers. In this point, there is a demand for a honeycomb structure in which honeycomb fired bodies are not easily displaced, coming off, or the like.

An embodiment of the present invention is: a honeycomb structure in which honeycomb fired bodies are hardly displaced or coming off, whereby exhaust gas leakage hardly occurs; and a method for manufacturing such a honeycomb structure.

First Embodiment

A first embodiment, an embodiment of the honeycomb structure and the method for manufacturing a honeycomb structure of the present invention, will be described hereafter with reference to the drawings.

Figure 1:
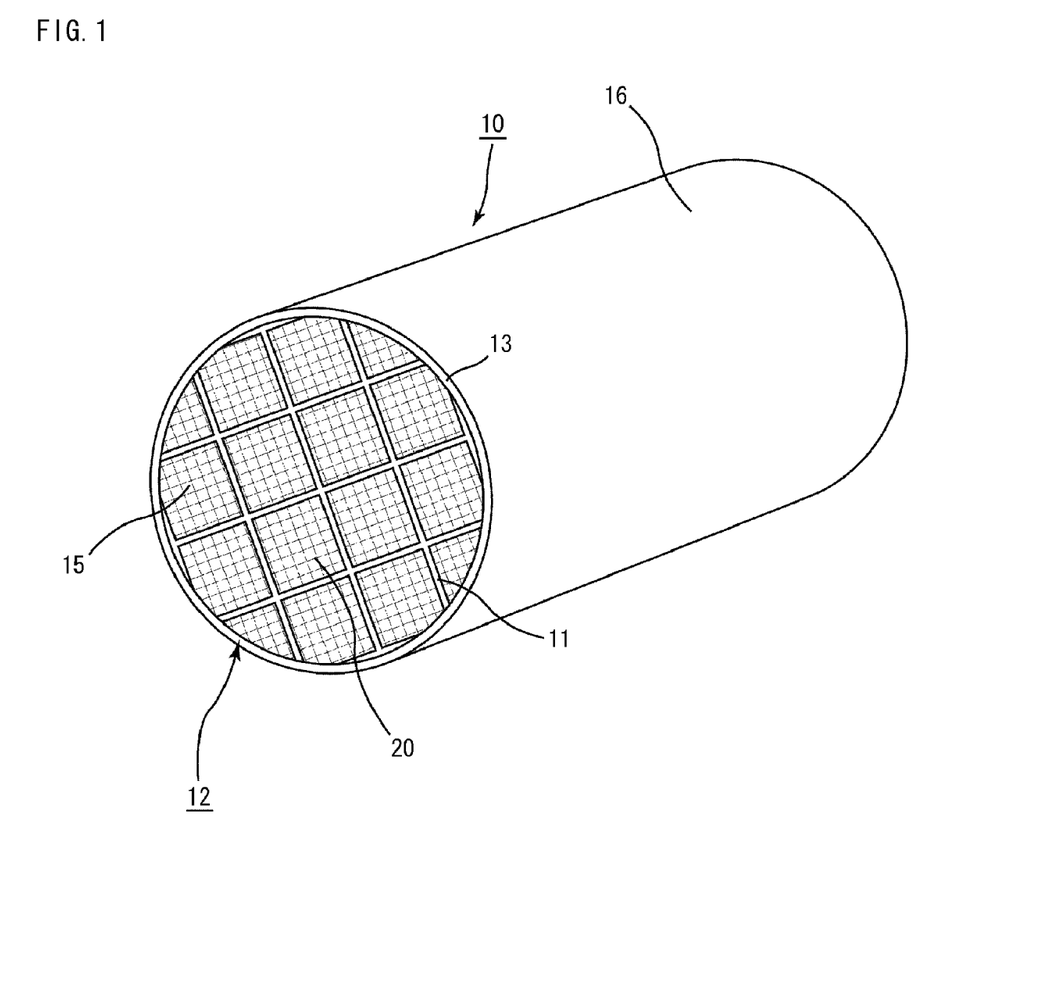
FIG. 1 is a perspective view schematically showing an example of a honeycomb structure according to an embodiment of the present invention.
Figure 2A:
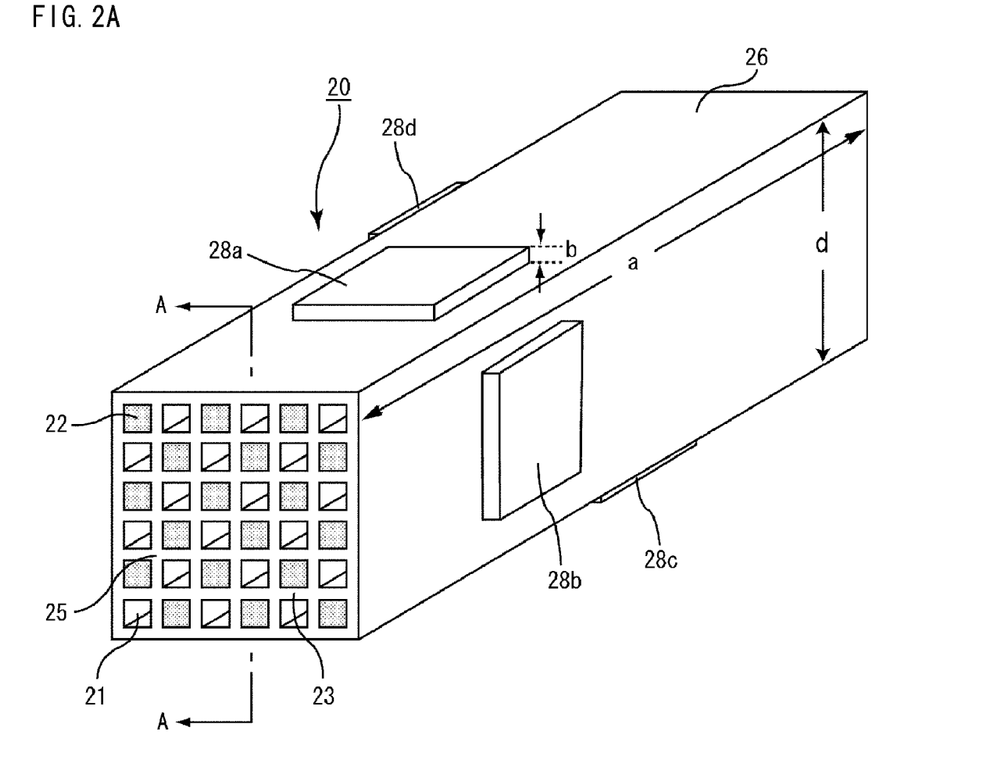
FIG. 2A is a perspective view schematically showing an example of a honeycomb fired body forming a honeycomb structure according to an embodiment of the present invention.
Figure 2B:
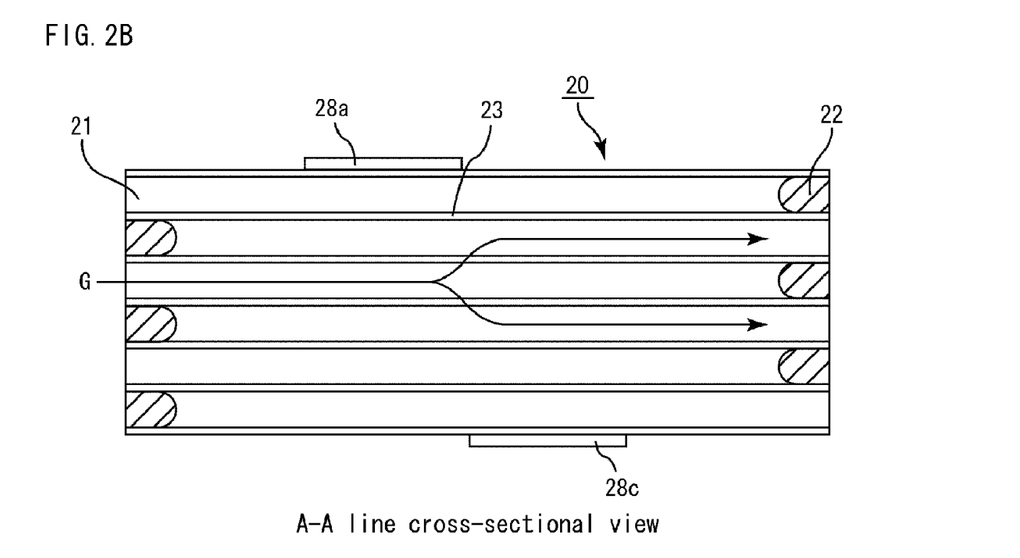
FIG. 2B is an A-A line cross-sectional view of FIG. 2A.

FIG. 1 is a perspective view schematically showing an example of a honeycomb structure according to the embodiment of the present invention. FIG. 2A is a perspective view schematically showing an example of a honeycomb fired body forming a honeycomb structure according to the embodiment of the present invention. FIG. 2B is an A-A line cross-sectional view of FIG. 2A.

A honeycomb structure 10 shown in FIG. 1 includes a plurality of porous silicon carbide honeycomb fired bodies 20 having a shape shown in FIGS. 2A and 2B and bonded together by interposing an adhesive layer 11 to form a ceramic block 12. A peripheral coat layer 13 is further formed around the periphery of the ceramic block 12.

The honeycomb fired body 20 shown in FIGS. 2A and 2B has a large number of cells 21 separated by cell walls 23 and longitudinally extending in parallel (the direction shown by an arrow "a" in FIG. 2A). The cells 21 are sealed with a plug 22 at either one end. Therefore, the exhaust gas G enters the cells 21 open at one end and exit from the cells 21 open at the other end inevitably through the cell walls 23 separating these cells 21. In this way, the cell walls 23 serve as a filter for collecting PM and the like.

Here, among the surfaces of the honeycomb fired body and honeycomb structure, the surfaces to which the cells are open are termed "end faces" and the surfaces other than the ends faces are termed "side faces".

As shown in FIG. 2A, the honeycomb fired body 20 has a projected portion 28a on one side face 26 thereof. The projected portion 28a is made of silicon carbide. Made of substantially the same forming material as that of the honeycomb fired body 20, the projected portion 28a is integrated with the honeycomb fired body. In other words, the projected portion 28a forms a part of the honeycomb fired body 20. The honeycomb fired body 20 shown in FIG. 2A has a projected portion 28a on one side face 26 and three more projected portions 28b, 28c, and 28d on the other three side faces, respectively.

The length of the projected portion 28a along the longitudinal direction a of the honeycomb fired body may be from about 10% to about 50% of the total longitudinal length of the honeycomb fired body and specifically from about 10 mm to about 80 mm. The height "b" of the projected portion 28a from the side face may be from about 2% to about 5% of the height "d" of the honeycomb fired body and specifically from about 0.5 mm to about 1.5 mm. These values can vary according to the degree of engagement of the projected portions required for the honeycomb structure or a final product, and to the thickness of the adhesive layer.

Figures 3A, 3B:
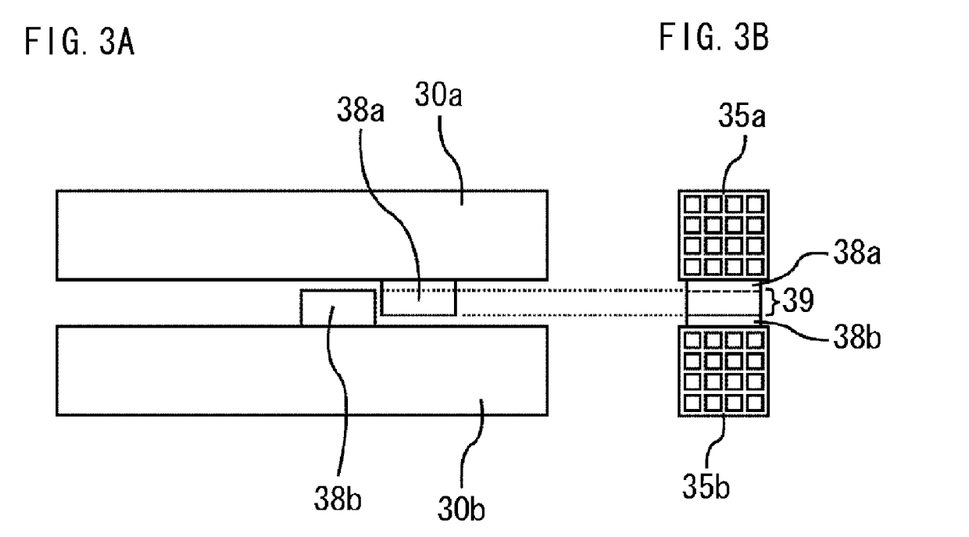
FIG. 3A is a side view schematically showing the positional relationship between the projected portions formed on adjacent honeycomb fired bodies according to an embodiment of the present invention.
FIG. 3B is a partial perspective view of the honeycomb fired bodies of FIG. 3A when seen from an end face thereof.

In the honeycomb structure according to the embodiment of the present invention, the projected portions formed on the honeycomb fired bodies overlap each other when seen from an end face of the honeycomb structure and the projected portions each formed on the adjacent honeycomb fired bodies abut each other. This configuration will be described with reference to FIGS. 3A and 3B. FIG. 3A is a side view schematically showing the positional relationship between the projected portions formed on adjacent honeycomb fired bodies according to the embodiment of the present invention. FIG. 3B is a partial perspective view of the honeycomb fired bodies of FIG. 3A when seen from an end face thereof.

As shown in FIG. 1, side faces of a plurality of honeycomb fired bodies 20 forming the honeycomb structure 10 are adjacent to each other on their by interposing an adhesive layer 11. FIG. 3A shows two adjacent honeycomb fired bodies 30a and 30b among them. In FIG. 3A, the upper honeycomb fired body 30a has a projected portion 38a on the side face opposing the lower honeycomb fired body 30b among its side faces. Similarly, the honeycomb fired body 30b also has a projected portion 38b on the side face opposing the honeycomb fired body 30a.

In the honeycomb structure according to the embodiment of the present invention, the projected portions 38a and 38b are formed on the side faces of the honeycomb fired bodies 30a and 30b, respectively, in the manner that they abut each other. In FIG. 3A, the projected portions 38a and 38b are not in contact with each other and, actually, there is an adhesive layer between them. In the embodiments of the present invention, the projected portions that are not actually in contact with each other but abut each other by interposing an adhesive layer are defined as adjacent projected portions.

FIG. 3B is a partial perspective view of the adjacent honeycomb fired bodies shown in FIG. 3A when seen from the right end face thereof. In FIG. 3B, the projected portion 38a formed on the side face of the honeycomb fired body 30a is in the near side and the projected portion 38b formed on the side face of the honeycomb fired body 30b is in the far side when seen from the paper surface. The projected portions 38a and 38b have an overlapped portion 39 as shown in FIG. 3B when seen from the end face 15 of the honeycomb structure (at the same end face as the end faces 35a and 35b of the honeycomb fired bodies). The extent of the overlapped portion 39 of the projected portions 38a and 38b can be changed according to the degree of engagement between the projected portions formed on the side faces of the honeycomb fired bodies and the required thickness of the adhesive layer.

With respect to the longitudinal positions on the honeycomb fired body, the projected portions 38a and 38b shown in FIG. 3A are formed on the honeycomb fired bodies 30a and 30b at positions shifted to the right end faces thereof in the figure. However, in this embodiment, the projected portions are not necessarily positioned closer to one end face thereof but can be at any longitudinal positions as required. The position of the projected portions 38a and 38b can be switched; i.e. the projected portion 38a can be formed on the left side of the projected portion 38b, and the projected portion 38b can be formed on the right side of the projected portion 38a.

Figure 4:
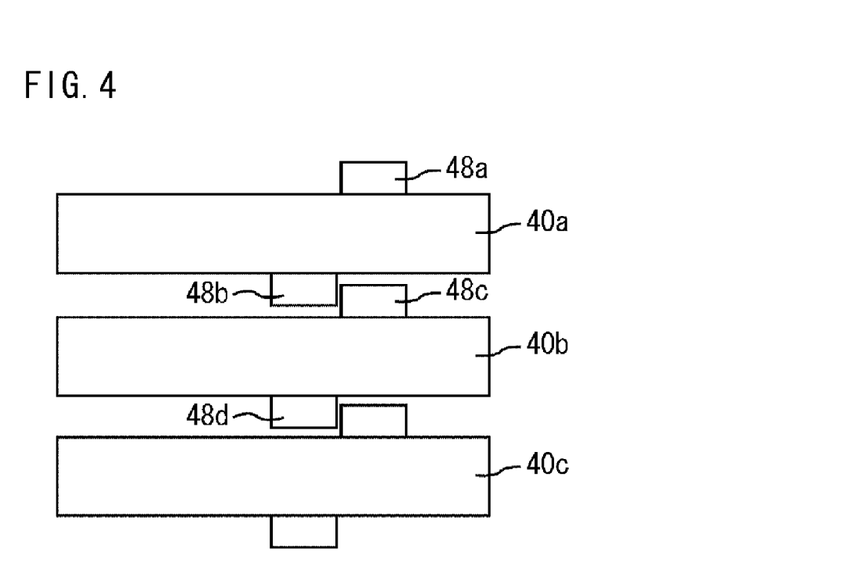
FIG. 4 is a side view showing the positional relationship between the projected portions when honeycomb fired bodies having projected portions according to an embodiment of the present invention are stacked.

Particularly, it is desirable that the projected portions are formed at positions where they engage each other and prevent the honeycomb fired bodies from coming off when an external force is applied to the honeycomb fired bodies from the exhaust gas inlet side. Specifically, it is desirable that they are formed at the positions shown in FIG. 4. FIG. 4 is a side view showing the positional relationship between the projected portions when the honeycomb fired bodies having projected portions according to the embodiment of the present invention are stacked. Desirably, as shown in FIG. 4, a projected portion 48a formed on one side face (also referred to as a first side face for convenience; the same applies to the other honeycomb fired bodies) and a projected portion 48b formed on the side face opposing the one side face (also referred to as a second side face for convenience; the same applies to the other honeycomb fired bodies) are at longitudinally shifted positions. Desirably, the respective projected portions are formed in the manner that when two honeycomb fired bodies face each other, a projected portion 48c formed on the first side face of another honeycomb fired body is placed on the second side face at a position corresponding to the projected portion 48a, and the projected portion 48b formed on the second side face of the one honeycomb fired body and the projected portion 48c formed on the first side face of the other honeycomb fired body abut each other. When the honeycomb fired bodies having projected portions positioned as described above are laid side by side, the projected portion formed on the first side face of one honeycomb fired body and the projected portion formed on the first side face of another honeycomb fired body are more likely to be oriented in the same direction and aligned. Similarly, the projected portion formed on the second side face of one honeycomb fired body and the projected portion formed on the second side face of another honeycomb fired body are more likely to be oriented in the same direction and aligned. With this arrangement, in whichever direction it goes, any longitudinal displacement of the one honeycomb fired body is more easily prevented by the projected portions formed on the adjacent honeycomb fired bodies.

Here, the honeycomb fired bodies located in the peripheral part of the honeycomb structure have projected portions only on the side faces in contact with other honeycomb fired bodies.

In order to form a honeycomb structure 10 using a plurality of honeycomb fired bodies 20 having projected portions, the projected portions are formed on one or more side faces of honeycomb fired bodies particularly at positions where they are susceptible to displacement or coming off so as to have the above described relationship, whereby a honeycomb structure in which the adjacent projected portions engage each other and are more likely to prevent any displacement of the honeycomb fired bodies is more easily obtained.

The method for manufacturing the honeycomb structure of this embodiment will be described hereafter.

First, a molding process is carried out in which a raw material paste containing ceramic powder and a binder is extrusion-molded to manufacture a honeycomb molded body.

In this process, first, silicon carbide powder having different average particle sizes as a ceramic raw material, an organic binder, a liquid plasticizer, a humectant, and water are mixed to prepare a raw material paste for manufacturing a honeycomb molded body.

Then, the raw material paste is charged in an extrusion molding machine.

Charged in the extrusion molding machine, the raw material paste is extrusion-molded into a honeycomb molded body having a predetermined shape. Then, the extrusion-molded, continuous honeycomb molded body is cut to a predetermined length.

Then, the honeycomb molded body is dried using a microwave drying apparatus, a hot-air drying apparatus, a dielectric drying apparatus, a reduced-pressure drying apparatus, a vacuum drying apparatus, a freeze drying apparatus, and the like.

In the method for manufacturing the honeycomb structure of this embodiment, the drying of the honeycomb molded body is followed by a projected portion forming process in which projected portions are formed on the side faces of the honeycomb molded body.

In the projected portion forming process, the above raw material paste forming the honeycomb molded body is applied on the side faces of the honeycomb molded body at positions to be provided with projected portions to form projected portions.

In order to form the projected portion 28a shown in FIG. 2A, a SUS plate jig (a mask) having an opening is placed on the side face of the honeycomb molded body and the raw material paste is filled into the opening. Then, the raw material paste overflowing the plate jig is removed and the plate jig is detached, whereby the projected portion 28a and the like is formed.

The above procedure is repeated on the side faces of the honeycomb molded body on which the projected portion has to be formed. Then, a honeycomb molded body having projected portions on the side faces can be manufactured.

In this embodiment, the material forming the projected portion is substantially the same material as the material forming the honeycomb molded body (i.e. the raw material paste). Therefore, in the subsequent firing process, the material forming the projected portion and the material forming the honeycomb molded body are sintered together and the projected portion is more easily integrated with the honeycomb fired body. Consequently, the projected portion integrated with the honeycomb fired body tends to provide high strength against any displacement of the honeycomb fired body and is more likely to prevent any displacement of the honeycomb fired body over a prolonged period of time.

After the projected portions are formed on the side faces of a honeycomb molded body, a sealing process is carried out in which predetermined cells are filled with a plug material paste serving as plugs to seal the cells.

With respect to conditions for the cutting, drying, and sealing processes, conditions conventionally used in manufacturing honeycomb fired bodies can apply.

Then, a degreasing process is carried out in which an organic matter in the honeycomb molded body is heated in a degreasing furnace. Subsequently, the honeycomb molded body is transferred to a firing furnace where a firing process is carried out to manufacture a honeycomb fired body.

With the above processes, a honeycomb fired body can be manufactured.

With respect to conditions for the degreasing and firing processes, conditions conventionally used in manufacturing honeycomb fired bodies can apply.

Then, a paste for an adhesive layer is applied on the side faces of the obtained honeycomb fired body to form a paste for an adhesive layer. Another honeycomb fired body is stacked by interposing the paste for an adhesive layer in sequence. This procedure is repeated to manufacture an aggregate of a predetermined number of honeycomb fired bodies bonded together. Here, the paste for an adhesive layer can include an inorganic binder, an organic binder, and at least one of inorganic fibers and inorganic particles.

For forming an aggregate of honeycomb fired bodies, the honeycomb fired bodies are stacked in the manner that the projected portion formed on a side face of one honeycomb fired body and the projected portion formed on a side face of another honeycomb fired body overlap each other when seen from an end face of the honeycomb structure and abut each other. Therefore, the longitudinal positions of the projected portions formed on the side faces of the honeycomb fired bodies are not the same for all honeycomb fired bodies, but they are positioned not to face each other as shown in FIG. 4.

The adhesive layer has to have a thickness that does not interfere with the overlapping of the projected portions when the honeycomb fired bodies are adjoined to each other by interposing the adhesive layer. Such thickness is not particularly restricted. The adhesive layer may be provided in the manner that the shortest distance between the side face of one honeycomb fired body and the projected portion of another honeycomb fired body is smaller than the height of the projected portion when honeycomb fired bodies are adjoined to each other by interposing the adhesive layer. The shortest distance may be from about 20% to about 80% of the height "b" of the projected portion from the side face of a honeycomb fired body. Specifically, the adhesive layer thickness at the shortest distance region can be from about 0.2 mm to about 0.8 mm.

The aggregate of honeycomb fired bodies is heated to dry and solidify the paste for an adhesive layer to yield an adhesive layer and manufacture a ceramic block. Then, a periphery processing is carried out in which the ceramic block is processed on the side faces using a diamond cutter to yield a round pillar shape.

Then, a peripheral coat layer forming process is carried out in which a paste for a peripheral coat layer is applied around the periphery of the round pillar-shaped ceramic block, dried, and solidified to form a peripheral coat layer.

With respect to the material for forming the paste for a peripheral coat layer, substantially the same material as the material of the paste for an adhesive layer can preferably be used or a different material can be used.

The above processes can manufacture a round pillar-shaped honeycomb structure in which a plurality of honeycomb fired bodies are bonded together by interposing an adhesive layer to form a ceramic block that has a peripheral coat layer around the periphery.

The peripheral coat layer is not essential but optional.

Actions and effects of the honeycomb structures body and the method for manufacturing the honeycomb structure of this embodiment are listed below.

(1) In the honeycomb structure of this embodiment, at least one projected portion is formed on each of the opposing side faces of honeycomb fired bodies adjacent to each other by interposing an adhesive layer in the manner that the projected portions formed on the honeycomb fired bodies overlap each other when seen from an end face of the honeycomb structure and the projected portions formed on adjacent honeycomb fired bodies abut each other.

In this way, when cracks develop in the adhesive layer and lower the adhesion strength, and the honeycomb fired bodies are definitely going to move, the adjacent projected portions formed on the side faces of the honeycomb fired bodies engage each other and tend to prevent any movement of the honeycomb fired bodies. Therefore, any displacement or coming off of the honeycomb fired bodies is more easily prevented. Particularly, in a large honeycomb structure on which displacement of the honeycomb fired bodies in the center portion has a large impact, the projected portions of adjacent honeycomb fired bodies are more likely to surely prevent the honeycomb fired bodies from being displaced or coming off.

(2) When the projected portions are formed on the side faces of a honeycomb fired body having the peripheral cell wall whose wall thickness is nearly equal to that of the other cell walls, it becomes easier to form the projected portions by applying substantially the same material as the forming material of the honeycomb molded body, i.e. the raw material paste, on the side faces of the honeycomb molded body.

(3) The method for manufacturing a honeycomb structure according to this embodiment includes: molding a ceramic raw material to manufacture a honeycomb molded body having a large number of cells separated by cell walls and longitudinally extending in parallel; firing the honeycomb molded body to manufacture a honeycomb fired body; and bonding a plurality of the honeycomb fired bodies together by interposing a paste for an adhesive layer to form a ceramic block, and the method further includes: forming a projected portion on each of the side faces of one piece of the honeycomb molded bodies and another piece of the honeycomb molded bodies in a manner that the projected portions formed on the honeycomb fired bodies overlap each other when seen from an end face of the honeycomb structure and the projected portions formed on the adjacent honeycomb fired bodies abut each other.

An unfired honeycomb molded body, whose forming material is not sintered, is relatively easy to process. Forming projected portions on such a honeycomb molded body using the raw material paste or adhesive-forming paste, it becomes easier to efficiently manufacture a honeycomb fired body having predetermined projected portions.

(4) In the method for manufacturing the honeycomb structure of this embodiment, the projected portions are formed on the side faces of a honeycomb molded body using a paste in the projected portion forming process, which is followed by the firing to form the projected portions on the side faces of a honeycomb fired body.

When the forming material of the honeycomb structure is applied on the side faces of a honeycomb molded body and then fired to form the projected portions, sintering reaction occurs between the applied forming material and the honeycomb molded body, and the obtained projected portions are more easily integrated with the honeycomb fired body. Being a part of the honeycomb fired body, the projected portions are more likely to provide high strength against stress generated while they engage each other. Therefore, a honeycomb structure more likely to prevent any damage to projected portions or any displacement of honeycomb fired bodies over a prolonged period of time is more easily manufactured. Here, it is desirable in the method for manufacturing the honeycomb structure of this embodiment that the paste is substantially the same material as the material of the raw material paste, the paste for an adhesive layer, or the paste for a peripheral coat layer.

EXAMPLES

Examples specifically disclosing the first embodiment of the present invention will be given hereafter. However, the present invention should not be intended to be limited to these Examples.

Example 1

An amount of 52.8% by weight of coarse silicon carbide powder having an average particle size of 22 μm and 22.6% by weight of fine silicon carbide powder having an average particle size of 0.5 μm were mixed. The obtained mixture was kneaded with the addition of 2.1% by weight of acrylic resin, 4.6% by weight of an organic binder (methyl cellulose), 2.8% by weight of a lubricant (UNILUB, manufactured by NOF Corp.), 1.3% by weight of glycerin, and 13.8% by weight of water to obtain a raw material paste, which was extrusion-molded and cut to manufacture a raw honeycomb molded body having a cross-section substantially the same as the cross section shown in FIGS. 2A and 2B and cells not sealed. This honeycomb molded body was dried using a microwave drying apparatus.

Then, the projection forming process was carried out in which predetermined projected portions were formed on the side faces of the honeycomb molded body. A projected portion was formed by placing on a side face of the honeycomb molded body a SUS mask having a thickness of 0.8 mm and an opening of 20×30 mm in a plan view and filling the opening on the side face of the honeycomb molded body with a raw material paste having the same composition as that of the honeycomb molded body into the shape shown in FIG. 2A. This procedure was repeated to form a projected portion on each of the side faces of the honeycomb molded body.

The above procedure was repeated on other honeycomb molded bodies to manufacture a plurality of honeycomb molded bodies having a projected portion on each of their side faces. In this example, the projected portions were formed in the manner that the projected portions engage each other and no honeycomb fired bodies come off in spite of any external force applied from the exhaust gas inlet side of the honeycomb fired body (i.e. the direction in which the pushing jig applies a load in the push-out test described later). Specifically, the projected portions formed on the side faces of these honeycomb molded bodies were positioned in the manner that when an aggregate of honeycomb fired bodies was formed, as shown in FIG. 2A and FIG. 4, the projected portions formed on the opposing side faces of two honeycomb fired bodies abut each other.

Predetermined cells of the honeycomb molded body having the projected portions formed were filled with a plug material paste having the same composition as that of the above raw molded body to seal the cells, which was dried again using a drying apparatus.

The dried honeycomb molded body was degreased at 400° C. and fired in an argon atmosphere under normal pressure at 2200° C. for three hours to manufacture a honeycomb fired body including a sintered silicon carbide having a porosity of 45%, an average pore diameter of 15 μm, measurements of 34.3 mm in height×34.3 mm in width×150 mm in length, a cell number (cell density) of 46.5 pcs/cm$^2$, and a cell wall thickness of 0.25 mm (10 mil). This honeycomb fired body had on the side faces projected portions having measurements of 20 mm×30 mm in a plan view and a height of 0.8 mm.

A large number of honeycomb fired bodies were bonded together using a heat-resistant paste for an adhesive layer containing 30% by weight of alumina fibers having an average fiber length of 20 μm, 21% by weight of silicon carbide particles having an average particle size of 0.6 μm, 15% by weight of silica sol, 5.6% by weight of carboxymethyl cellulose, and 28.4% by weight of water. In doing so, the honeycomb fired bodies were bonded together in the manner that the projected portions formed in the projected portion forming process overlap each other when seen from an end face of the honeycomb fired bodies and abut each other. The paste for an adhesive layer was applied to a thickness of 1.0 mm between the side faces of adjacent honeycomb fired bodies and to a thickness of 0.2 mm between the side face of one honeycomb fired body and the projected portion of another honeycomb fired body.

The aggregate of honeycomb fired bodies was dried at 120° C. and subsequently cut using a diamond cutter to manufacture a round pillar-shaped ceramic block.

A paste for a peripheral coat layer having a thickness of 0.2 mm was formed around the periphery of the ceramic block using a paste for a peripheral coat layer having the same composition as that of the paste for an adhesive layer. The paste for a peripheral coat layer was dried at 120° C., whereby a round pillar-shaped honeycomb structure having a peripheral coat layer around the periphery and measurements of 143.8 mm in diameter×150 mm in length was manufactured.

Comparative Example 1

A honeycomb structure was manufactured in the same manner as in Example 1 except that no projected portions were formed on the side faces of the honeycomb fired bodies.

Comparative Example 2

A honeycomb structure was manufactured in the same manner as in Example 1 except that the side faces of the honeycomb fired bodies had a surface roughness (ten-point average roughness) Rz of 60 μm in place of the projected portions being formed on the side faces of the honeycomb fired bodies. The surface roughness was controlled by a known sandblasting on the side faces of the honeycomb fired bodies. The surface roughness Rz was measured according to JIS B0601.

The contents of JIS B0601 are incorporated herein by reference in their entirety.

(Push-Out Strength Test)

Push-out strength was measured on the honeycomb structures manufactured in Example 1 and Comparative Examples 1 and 2.

Figure 5A:
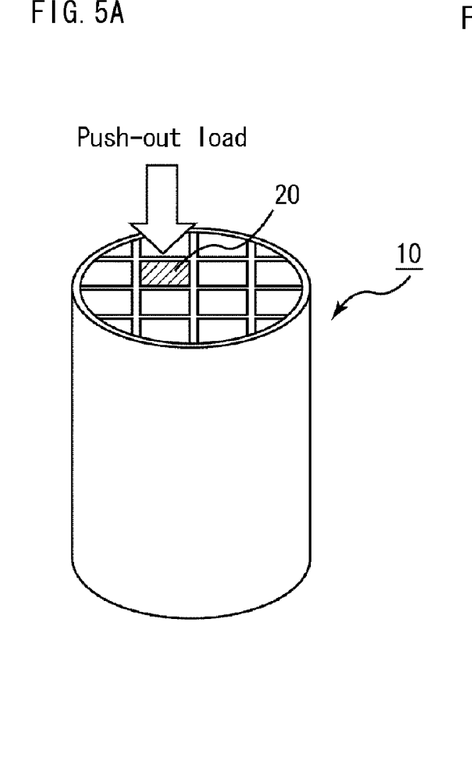
FIG. 5A is a perspective view schematically showing the portion of the end face of a honeycomb structure to which a push-out load was applied in a push-out strength test.
Figure 5B:
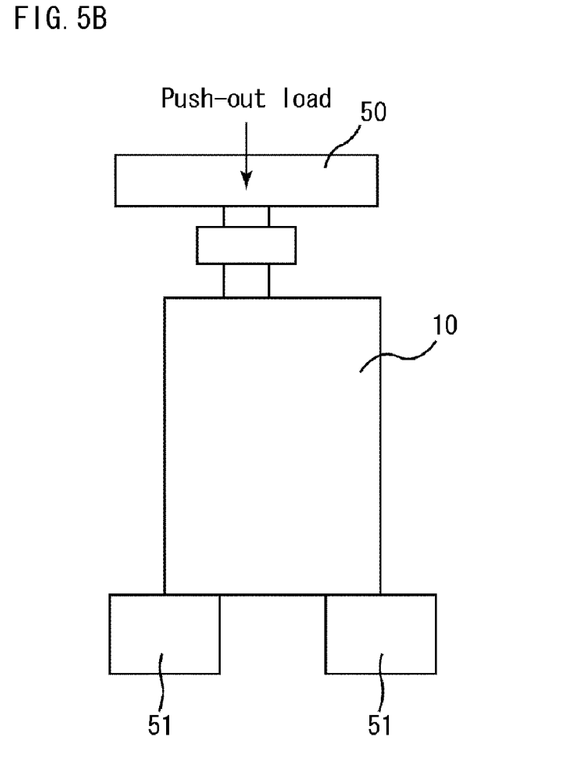
FIG. 5B is a side view schematically showing a push-out strength test equipment.

Specifically, as shown in FIGS. 5A and 5B, a honeycomb structure 10 including a plurality of honeycomb fired bodies 20 bonded together by interposing an adhesive layer was placed on pedestals 51, and a push-out load (pressing speed of 1 mm/min) was applied to a honeycomb fired body 20 around the center (the shaded part in FIG. 5A) using an aluminum jig 50 having a diameter of 30 mm. The load with which the honeycomb fired body 20 was either pushed out or broken was measured and the result was defined as the push-out strength of the portion where the honeycomb fired body 20 was bonded by the adhesive layer. FIG. 5A is a perspective view schematically showing the portion of the end face of a honeycomb structure to which a push-out load was applied in a push-out strength test. FIG. 5B is a side view schematically showing a push-out strength test equipment.

An Instron universal tester (Model 5582) was used for strength measurement.

As a result, the push-out strength of the honeycomb structure of Example 1 was not measured because the push-out load was too high (a load of 6 kN, which was about three times larger than that for Comparative Example 2, did not displace the honeycomb fired body). This is presumably because the projected portions formed on the side faces of the honeycomb fired bodies engaged each other and significantly increased the strength against the push-out load.

On the other hand, the honeycomb structure of Comparative Example 1 had a push-out strength of 1.47 kN and the honeycomb structure of Comparative Example 2 had a push-out strength of 2.04 kN. Either one of the honeycomb structures had a low push-out strength and presumably causes the honeycomb fired bodies to be displaced from the honeycomb structure while in use.

Second Embodiment

A second embodiment will be described hereafter with reference to the drawings.

In the honeycomb structure of the second embodiment, projected portions are formed on adjacent honeycomb fired bodies in the manner that one honeycomb fired body has a first projected portion on its side face, the other honeycomb fired body has first and second projected portions on a side face, and the first projected portion formed on the side face of the one honeycomb fired body is formed between the first and second projected portions formed on the side face of the other honeycomb fired body and the first projected portion formed on the side face of the one honeycomb fired body and the first and second projected portions formed on the side face of the other honeycomb fired body abut each other.

Figure 6A:
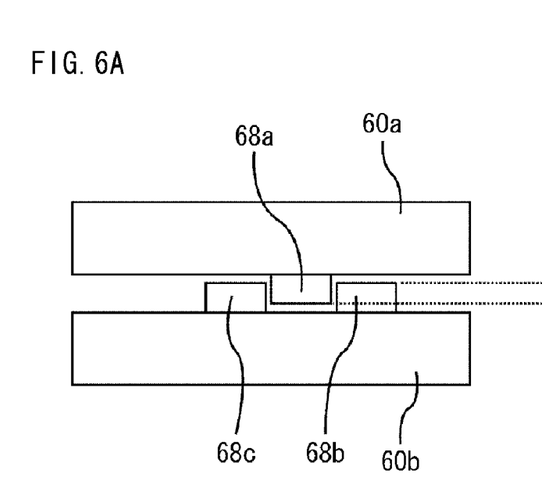
FIG. 6A is a side view schematically showing another positional relationship between the projected portions formed on adjacent honeycomb fired bodies according to an embodiment of the present invention.
Figure 6B:
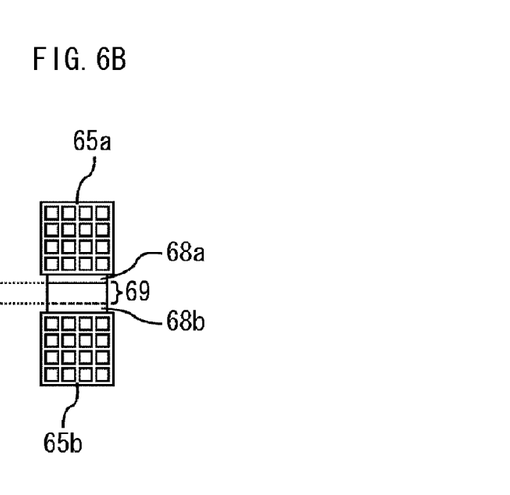
FIG. 6B is a partial perspective view of the honeycomb fired bodies shown in FIG. 6A when seen from an end face thereof.

FIG. 6A is a side view schematically showing another positional relationship between the projected portions formed on adjacent honeycomb fired bodies according to the embodiment of the present invention. FIG. 6B is a partial perspective view of the honeycomb fired bodies shown in FIG. 6A when seen from its end face thereof. In FIG. 6A, the upper honeycomb fired body 60*a* has a projected portion 68*a* on the side face opposing the lower honeycomb fired body 60*b*. On the other hand, the honeycomb fired body 60*b* has two projected portions 68*b* and 68*c* on the side face opposing the honeycomb fired body 60*a*.

Also in the honeycomb structure of this embodiment, the one projected portions 68*a* and the two projected portions 68*b* and 68*c* are formed on the side faces of the honeycomb fired bodies 60*a* and 60*b*, respectively, in the manner that they abut each other. In FIG. 6A, the projected portion 68*a* and the projected portions 68*b* and 68*c* are not in contact with each other and practically have a relationship of abutting each other with the adhesive layer therebetween.

FIG. 6B is a partial perspective view of the adjacent honeycomb fired bodies shown in FIG. 6A when seen from the right end face thereof. The projected portion 68b formed on the side face of the honeycomb fired body 60b is in the near side and the projected portion 68a formed on the honeycomb fired body 60a is in the far side when seen from the paper surface. Furthermore, the projected portion 68c is present further behind the projected portion 68a when seen from the paper surface although it is not illustrated. These projected portions 68a, 68b, and 68c have an overlapped portion 69 when seen from an end face 15 of the honeycomb structure (at the same end face as the end faces 65a and 65b of the honeycomb fired bodies), as shown in FIG. 6B. The overlapped projected portions are more likely to prevent any longitudinal displacement of the honeycomb fired bodies. The extent of the overlapped portion 69 of the projected portions 68a, 68b, and 68c can be changed based on the degree of engagement between the projected portions formed on the side faces of the honeycomb fired bodies and the required thickness of the adhesive layer.

Figure 7:
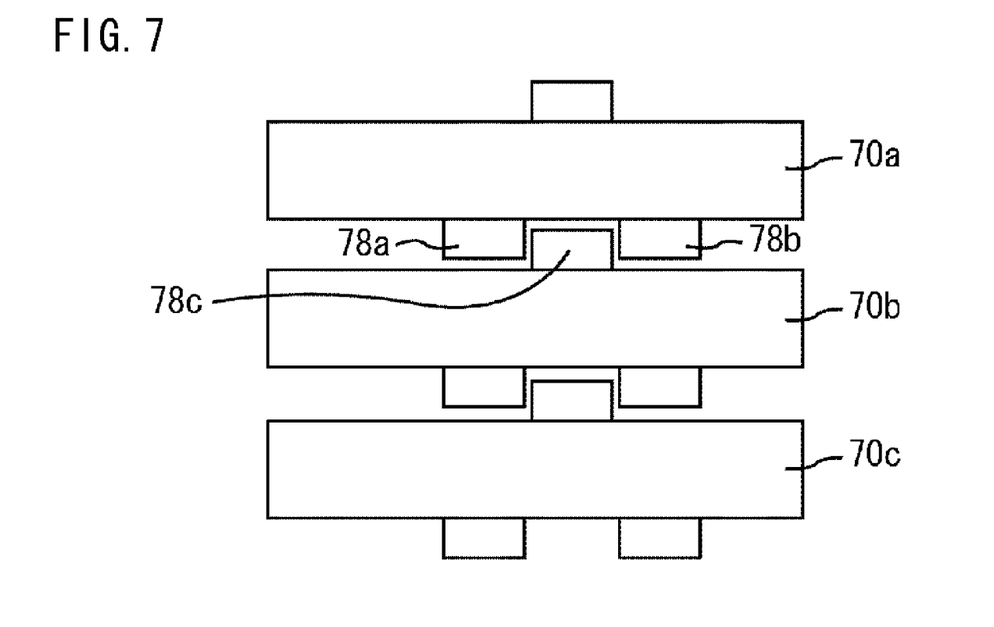
FIG. 7 is a side view schematically showing another positional relationship between the projected portions when honeycomb fired bodies having projected portions according to an embodiment of the present invention are stacked.

In the honeycomb structure of the second embodiment, when the honeycomb fired body having a first projected portion and the honeycomb fired body having first and second projected portions are stacked, as shown in FIG. 7, a projected portion 78c formed on one side face (also referred to as a first side face for convenience; the same applied to the other honeycomb fired bodies) of one honeycomb fired body 70b is fitted in between two projected portions 78a and 78b formed on the side face opposing the first side face (also referred to as a second side face for convenience; the same applied to the other honeycomb fired bodies) of another honeycomb fired body 70a. For stacking even another honeycomb fired body, a projected portion formed on the first side face of the another honeycomb fired body is fitted in between the first and second projected portions formed on the second side face of the honeycomb fired body 70b. In this way, an additional honeycomb fired body is stacked in sequence to form a ceramic block. With this arrangement, in whichever direction it goes, any longitudinal displacement of the one honeycomb fired body is more easily prevented by the projected portions formed on the adjacent honeycomb fired bodies.

Here, the honeycomb fired bodies located in the peripheral portion of the honeycomb structure have projected portions only on the side faces in contact with other honeycomb fired bodies.

For manufacturing the honeycomb structure of the second embodiment, a raw material paste is applied on one side face so as to form a single projected portion and the raw material paste is applied on the side face opposing the one side face so as to form two projected portions using a planar frame having an opening in the projected portion forming process. This procedure can be repeated on the other side faces and other honeycomb molded bodies to manufacture the honeycomb structure of this embodiment.

Figure 8:
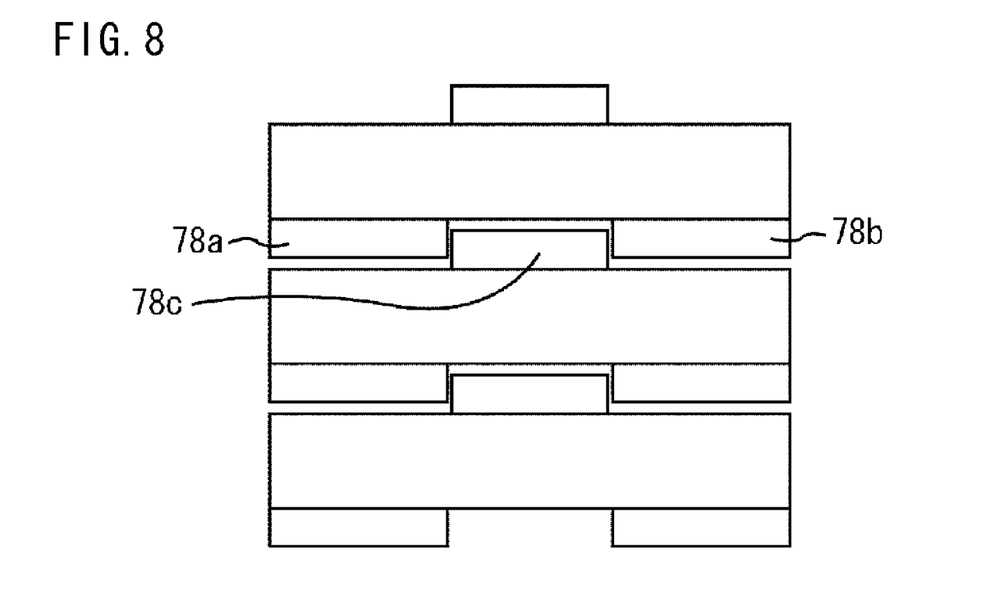
FIG. 8 is a side view schematically showing even another positional relationship between the projected portions when honeycomb fired bodies having projected portions according to an embodiment of the present invention are stacked.

After the first projected portion of one honeycomb fired body is fitted in between the first and second projected portions of another honeycomb fired body, these three projected portions may together extend over a part of the side faces of the honeycomb fired bodies as the projected portions 78a, 78b, and 78c in FIG. 7 or the three adjacent projected portions may together extend over the entire length of the side faces of the honeycomb fired bodies as the projected portions 78a, 78b, and 78c in FIG. 8.

The honeycomb structure of the second embodiment of the present invention also has the same effects (1) to (4) as in the first embodiment.

(5) Furthermore, in the honeycomb structure of the second embodiment of the present invention, the projected portion of one honeycomb fired body and the first and second projected portions of another honeycomb fired body are formed as though they were recessed and projected portions fitting each other. Therefore, there is no need of considering the positions of projected portions that prevent all honeycomb fired bodies from coming off. Any displacement or coming off of honeycomb fired bodies is more easily prevented in an easy and secure manner.

Third Embodiment

In the above embodiments, the projected portions are formed by applying on the side faces of the honeycomb molded body a raw material paste having substantially the same composition as that of the honeycomb molded body. The formation of the projected portions is not restricted thereto. A plate body can be placed on the side faces of the honeycomb molded body to form projected portions.

As such a plate body, in order to form projected portions having targeted dimension (height, width, and length), a plate body having corresponding dimension (thickness, width, and length) can be used. The material forming the plate body is not particularly restricted. A raw material paste having substantially the same composition as that of the honeycomb molded body, a paste for an adhesive layer used for bonding a plurality of honeycomb fired bodies, a paste for a peripheral coat layer used for forming a peripheral coat layer, and the like can be used. These pastes have substantially the same composition, which tends to provide excellent adhesion of the plate body to the side faces of the honeycomb molded body or the honeycomb fired body.

When the plate body includes the above-described paste, the plate body can be undried, dried, or sintered for use. Desirably, an unsintered, namely undried or dried, plate body can be used so that it is sintered and integrated with the material forming the honeycomb molded body during the subsequent firing process of the honeycomb molded body.

It is not always necessary that the plate body and the honeycomb molded body are integrated through direct sintering reaction. The sintered plate body can be attached to the side faces of the honeycomb molded body by interposing any of the above pastes and fired to integrate them. This technique can also provide a honeycomb structure more likely to prevent any displacement over a prolonged period of time.

The honeycomb structure of the third embodiment of the present invention also has the same effects (1) to (4) as in the first embodiment.

(6) Furthermore, use of plate bodies for forming the projected portions is more likely to facilitate the formation of projected portions.

Fourth Embodiment

A fourth embodiment will be described with reference to the drawings hereafter.

In this embodiment, the projected portions are formed by cutting the side faces of the honeycomb molded body. A honeycomb structure more likely to prevent any longitudinal displacement is more easily manufactured also by forming the projected portions through the cutting process.

Figure 9A:
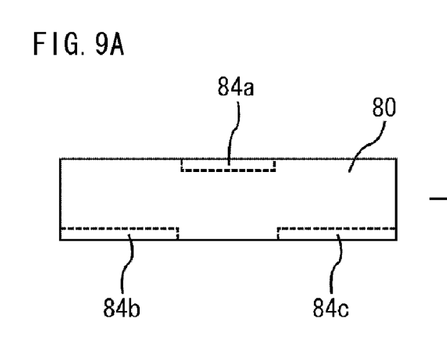
FIG. 9A is a side view schematically showing a honeycomb molded body before the cutting process according to an embodiment of the present invention.
Figure 9B:
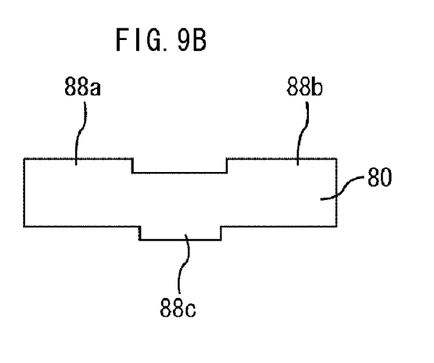
FIG. 9B is a side view schematically showing a honeycomb molded body having projected portions after the cutting process according to an embodiment of the present invention.

FIG. 9A is a side view schematically showing a honeycomb molded body before the cutting process according to the embodiment of the present invention. FIG. 9B is a side view schematically showing a honeycomb molded body having projected portions after the cutting process according to the embodiment of the present invention.

The honeycomb molded body can be either undried after the extrusion molding and cutting processes or dried after the subsequent drying process. However, it is preferable to cut the dried honeycomb molded body in consideration of easiness to cut and handle.

First, it is determined which portions are cut on the side faces of a honeycomb molded body. Specifically, as shown in FIG. 9A, a portion 84a on one side face and portions 84b and 84c on the side face opposing the one side face of a honeycomb molded body 80 are chosen to cut. The portions to be cut can be optionally chosen in advance considering the targeted size, shape, number and the like of projected portions.

Then, the cutting process is carried out on the portions to be cut. The cutting process is not particularly restricted and carried out by some processing technique including milling, planing, end milling, and the like. Among these processing techniques, end milling is preferable in consideration of processing on a dried honeycomb molded body and the degree of freedom of the forming position.

With the side faces of a honeycomb molded body being cut as described above, a honeycomb molded body having two projected portions 88a and 88b formed on one side face and a projected portion 88c formed on the side face opposing the one side face can be manufactured as shown in FIG. 9B. The three projected portions 88a, 88b, and 88c form part of the side faces of the honeycomb molded body and will form part of a honeycomb fired body after the firing process as they are. The projected portions formed in this way tend to provide high strength against any displacement of the honeycomb fired body and is more likely to prevent any displacement of the honeycomb fired body over a prolonged period of time.

In this embodiment, the side faces of a honeycomb molded body are cut to form projected portions. Therefore, the cell walls forming the side faces of the honeycomb molded body (i.e. the peripheral cell walls) tends to be reduced in thickness. The thickness of the peripheral cell walls and the thickness of the other cell walls (i.e. the inner cell walls) may be substantially equal as long as the peripheral cell walls hold against the cutting. However, the peripheral cell walls having a reduced thickness may degrade in strength. Therefore, the peripheral cell walls desirably have a larger thickness than the inner cell walls. In this way, the cell walls which are processed by cutting are more likely to have a thickness maintaining sufficient strength even after the side faces of the honeycomb molded body is cut. In order to manufacture a honeycomb molded body having the peripheral cell walls thicker than the inner cell walls, the extrusion molding die can be wider at the part corresponding to the peripheral cell walls than at the part corresponding to the inner cell walls.

Figure 10:
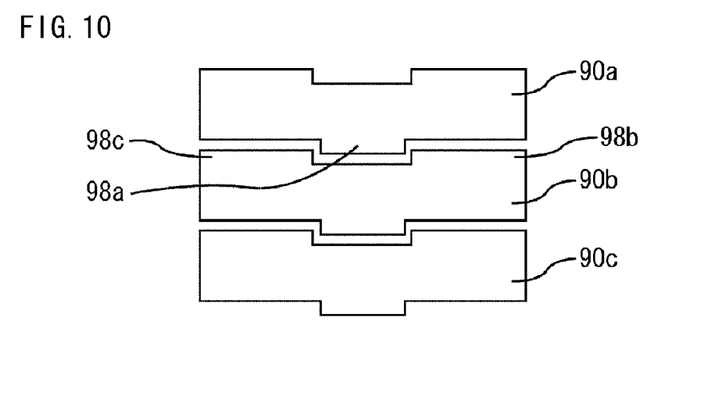
FIG. 10 is a side view showing the positional relationship of projected portions when honeycomb fired bodies having projected portions formed by the cutting according to an embodiment of the present invention are stacked.

After other honeycomb molded bodies are cut to form similar projected portions, one projected portion formed on a side face of one honeycomb fired body is fitted in between two projected portions formed on another honeycomb fired body, whereby a plurality of honeycomb fired bodies are more likely to be easily stacked with no displaceable relationship. This procedure will be described with reference to FIG. 10. FIG. 10 is a side view showing the positional relationship of projected portions when honeycomb fired bodies having projected portions formed by the cutting according to the present embodiment are stacked.

In the honeycomb structure of the fourth embodiment of the present invention, a honeycomb fired body having a first projected portion and a honeycomb fired body having first and second projected portions are stacked in the manner that, as shown in FIG. 10, a projected portion 98a formed on one side face (also referred to as a first side face for convenience; the same applied to the other honeycomb fired bodies) of one honeycomb fired body 90a is fitted in between two projected portions 98b and 98c formed on the side face opposing the first side face (also referred to as a second side face for convenience; the same applied to the other honeycomb fired bodies) of another honeycomb fired body 90b. For stacking even another honeycomb fired body 90c, a projected portion formed on the first side face of the honeycomb fired body 90b is fitted in between the first and second projected portions formed on the second side face of the honeycomb fired body 90c. In this way, an additional honeycomb fired body is stacked in sequence to form a ceramic block. With this arrangement, in whichever direction it goes, any longitudinal displacement of the one honeycomb fired body is more easily prevented by the projected portions formed on the adjacent honeycomb fired bodies.

The honeycomb structure of the fourth embodiment of the present invention also has the same effects (1) to (4) as in the first embodiment.

(7) Furthermore, in this embodiment, the projected portions are formed on a honeycomb molded body that is easy to cut. Therefore, a honeycomb fired body having projected portions is more easily manufactured in a simpler and productive manner. The projected portions that overlap each other when seen from an end face thereof and abut each other are integrated with the honeycomb fired body and become a part of the honeycomb fired body, thereby tending to provide high strength against stress generated upon displacement. Hence, a honeycomb structure in which honeycomb fired bodies are hardly displaced or coming off over a prolonged period of time is more easily manufactured.

Other Embodiments

The formation pattern of projected portions is not restricted to those described above. For example, one honeycomb molded body can have two projected portions on one side face and also two projected portions on the side face opposing the one side face. In such a case, another honeycomb molded body has a single projected portion on one side face and also a single projected portion on the side face opposing the one side face.

The shape of the honeycomb structure according to the embodiments of the present invention is not restricted to a round pillar shape shown in FIG. 1 and can be any pillar shape such as a cylindroid shape, a pillar shape with a racetrack end face, and a polygonal pillar shape.

The honeycomb structure according to the embodiments of the present invention desirably has a porosity of from about 30% to about 70%.

This is because the honeycomb structure is more likely to maintain strength and low resistance for the exhaust gas passing through the cell walls.

When the porosity is about 30% or more, the cell walls are not likely to be clogged soon. On the other hand, when the porosity is about 70% or less, the honeycomb structure tends not to have a lowered strength and is not likely to be broken.

The above porosity can be measured by a known prior art technique such as mercury porosimetry, Archimedes method, scanning electron microscope (SEM), and the like.

The cell density in a cross section perpendicular to the longitudinal direction of the honeycomb fired body is not particularly restricted. However, a desirable lower limit is about 31.0 pcs/cm$^2$ (about 200 pcs/inch$^2$) and a desirable upper limit is about 93.0 pcs/cm$^2$ (about 600 pcs/inch$^2$), and a more desirable lower limit is about 38.8 pcs/cm$^2$ (about 250 pcs/inch$^2$) and a more desirable upper limit is about 77.5 pcs/cm$^2$ (about 500 pcs/inch$^2$).

The main ingredient of the forming material of the honeycomb fired body is not restricted to silicon carbide and can be other ceramic raw materials including: nitride ceramics such as aluminum nitride, silicon nitride, boron nitride, and titanium nitride; carbide ceramics such as zirconium carbide, titanium carbide, tantalum carbide, and tungsten carbide; complex of metal and nitride ceramic; complex of metal and carbide ceramic; and the like.

Furthermore, the forming material can be ceramic raw materials such as silicon-containing ceramics or the above ceramic mixed with metal silicon, ceramics bonded by silicon or silicate compounds, and the like.

Among the above-listed ceramic raw materials, silicon carbide, which is excellent in heat resistance, mechanical strength, and heat conductivity, is a particularly desirable main ingredient of the forming material of the honeycomb fired body.

Silicon carbide mixed with metal silicon (silicon-containing silicon carbide) is also desirable.

The honeycomb structure according to the embodiments of the present invention can support catalyst for converting and/or purifying exhaust gases. Examples of the desirable catalyst to be supported include noble metals such as platinum, palladium, and rhodium. Among them, platinum is more desirable. Examples of other catalysts include: alkali metals such as potassium and sodium; and alkaline earth metals such as barium. These catalysts can be used alone or in combination of two or more.

For supporting catalyst, the cell walls of the honeycomb structure can have a catalyst supporting layer for highly dispersed catalyst. The material forming the catalyst supporting layer is desirably a material having a large specific surface area for supporting the catalyst in a highly dispersed manner, including oxide ceramics such as alumina, titania, zirconia, and silica.

The above materials can be used alone or in combination of two or more.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A honeycomb structure comprising:
a ceramic block formed by combining a plurality of honeycomb fired bodies together with an adhesive layer interposed between the plurality of honeycomb fired bodies, said plurality of honeycomb fired bodies each having cell walls extending along a longitudinal direction of the honeycomb fired bodies to define cells,
wherein
said honeycomb fired bodies adjacent to each other via said adhesive layer each have at least one projected portion on the opposing side faces,
the projected portions formed on said honeycomb fired bodies overlap each other when seen from an end face of the honeycomb structure and the projected portions formed on said adjacent honeycomb fired bodies abut each other, and
said adhesive layer is provided in a manner that a shortest distance between a side face of one of said adjacent honeycomb fired bodies and a projected portion of another of said adjacent honeycomb fired bodies is smaller than a height of said projected portion from a side face of said another of said adjacent honeycomb fired bodies when said honeycomb fired bodies are adjoined to each other via said adhesive layer.

2. The honeycomb structure according to claim 1, wherein
one of said adjacent honeycomb fired bodies has a first projected portion on a side face,
another of said adjacent honeycomb fired bodies has a first projected portion and a second projected portion on a side face, and
the projected portions are formed in a manner that the first projected portion formed on the side face of said one of said adjacent honeycomb fired bodies is formed between the first and second projected portions formed on the side face of said another of said adjacent honeycomb fired bodies and the first projected portion formed on the side face of said one of said adjacent honeycomb fired bodies and the first and second projected portions formed on the side face of said another of said adjacent honeycomb fired bodies abut each other.

3. The honeycomb structure according to claim 1, wherein
a thickness of cell walls of a periphery of said honeycomb fired bodies is substantially same as a thickness of cell walls other than the cell walls of the periphery.

4. The honeycomb structure according to claim 1, wherein
a thickness of cell walls of a periphery of said honeycomb fired bodies is larger than a thickness of cell walls other than the cell walls of the periphery.

5. The honeycomb structure according to claim 1, wherein
a peripheral coat layer is formed around a periphery of said ceramic block.

6. The honeycomb structure according to claim 5, wherein
said peripheral coat layer is formed by drying and solidifying a paste for a peripheral coat layer.

7. The honeycomb structure according to claim 1, wherein
a length of said projected portions along the longitudinal direction of said honeycomb fired bodies is from about 10% to about 50% of a total longitudinal length of said honeycomb fired bodies.

8. The honeycomb structure according to claim 1, wherein
a height of said projected portions from the side faces of said honeycomb fired bodies is from about 2% to about 5% of a height of said honeycomb fired bodies.

9. The honeycomb structure according to claim 1, wherein
said shortest distance is from about 20% to about 80% of the height of the projected portion from a side face of said another of said adjacent honeycomb fired bodies.

10. The honeycomb structure according to claim 1, wherein
said adhesive layer is formed by drying and solidifying a paste for an adhesive layer.

11. The honeycomb structure according to claim 1, wherein
the side faces of said ceramic block are processed into a predetermined shape through periphery processing.

12. The honeycomb structure according to claim 1, wherein
one honeycomb fired body has two of said projected portions on one side face and also has two of said projected portions on a side face on a reverse side of said one side face.

13. The honeycomb structure according to claim 1, wherein
materials for forming said honeycomb fired bodies comprise at least one of
a nitride ceramic;
a carbide ceramic;
a complex of a metal and a nitride ceramic;
a complex of a metal and a carbide ceramic;
a silicon-containing ceramic in which metal silicon is mixed with at least one of a nitride ceramic, a carbide ceramic, a complex of a metal and a nitride ceramic, and a complex of a metal and a carbide ceramic; and
a ceramic in which at least one of a nitride ceramic, a carbide ceramic, a complex of a metal and a nitride ceramic, and a complex of a metal and a carbide ceramic is bonded by silicon or a silicate compound.

14. The honeycomb structure according to claim 13, wherein
forming material of said honeycomb fired body comprises at least one of silicon carbide and silicon-containing silicon carbide.

15. The honeycomb structure according to claim 1, wherein
a catalyst for converting and/or purifying exhaust gases is supported on said honeycomb structure.

16. The honeycomb structure according to claim 15, wherein
said catalyst comprises at least one of noble metals, alkali metals, and alkaline earth metals.

17. A method for manufacturing a honeycomb structure, said method comprising:
molding a ceramic raw material to manufacture honeycomb molded bodies each having cell walls extending along a longitudinal direction of the honeycomb fired bodies to define cells;
firing said honeycomb molded bodies to manufacture honeycomb fired bodies;
bonding a plurality of said honeycomb fired bodies together with a paste for an adhesive layer interposed between said honeycomb fired bodies to form a ceramic block; and
forming a projected portion on each of side faces of one piece of said honeycomb molded bodies and another piece of said honeycomb molded bodies in a manner that the projected portions formed on said honeycomb fired bodies overlap each other when seen from an end face of said honeycomb structure and the projected portions formed on said adjacent honeycomb fired bodies abut each other,
wherein said adhesive layer is provided in a manner that a shortest distance between a side face of one of said adjacent honeycomb fired bodies and a projected portion of another of said adjacent honeycomb fired bodies is smaller than a height of said projected portion from a side face of said another of said adjacent honeycomb fired bodies when said honeycomb fired bodies are adjoined to each other via said adhesive layer.

18. The method for manufacturing a honeycomb structure according to claim 17, wherein
one of said honeycomb fired bodies has a first projected portion on a side face,
another of said honeycomb fired bodies has a first projected portion and a second projected portion on a side face, and
the projected portions are formed in a manner that the first projected portion formed on the side face of said one of said honeycomb fired bodies is formed between the first and second projected portions formed on the side face of said another of said honeycomb fired bodies and the first projected portion formed on the side face of said one of said honeycomb fired bodies and the first and second projected portions formed on the side face of said another of said honeycomb fired bodies abut each other.

19. The method for manufacturing a honeycomb structure according to claim 17, the method further comprising:
applying a paste for a peripheral coat layer around a periphery of said ceramic block, and then drying and solidifying the paste to form a peripheral coat layer.

20. The method for manufacturing a honeycomb structure according to claim 17, wherein
in said projected portion formation, a plate body is placed on a side face of said honeycomb molded body, which is followed by the firing to form a projected portion on the side face of said honeycomb fired body.

21. The method for manufacturing a honeycomb structure according to claim 20, wherein
said plate body comprises either a molded body or a fired body manufactured by using substantially a same material as a material of a raw material paste, said paste for an adhesive layer, or a paste for a peripheral coat layer.

22. The method for manufacturing a honeycomb structure according to claim 20, wherein
said plate body is placed via a paste.

23. The method for manufacturing a honeycomb structure according to claim 22, wherein
said paste is prepared using a substantially same material as a material of a raw material paste, said paste for an adhesive layer, or a paste for a peripheral coat layer.

24. The method for manufacturing a honeycomb structure according to claim 20, wherein
an undried or dried plate body is used as said plate body.

25. The method for manufacturing a honeycomb structure according to claim 20, wherein
said plate body is arranged on the side faces of said honeycomb molded body by attaching a sintered plate body to the side faces of the honeycomb molded body via a paste.

26. The method for manufacturing a honeycomb structure according to claim 25, wherein
any one of a raw material paste, said paste for an adhesive layer, and a paste for a peripheral coat layer is used as said paste.

27. The method for manufacturing a honeycomb structure according to claim 17, wherein
the projected portions are formed on the side faces of said honeycomb molded body using a paste in said projected portion formation, and
then, the firing is carried out to form the projected portions on the side faces of said honeycomb fired body.

28. The method for manufacturing a honeycomb structure according to claim 27, wherein
said paste is prepared using a substantially same material as a material of a raw material paste, said paste for an adhesive layer, or a paste for a peripheral coat layer.

29. The method for manufacturing a honeycomb structure according to claim 17,
wherein
the side faces of said honeycomb molded body are cut to form said projected portions in said projected portion formation.

30. The method for manufacturing a honeycomb structure according to claim 29,
wherein
said cutting is carried out on a dried honeycomb molded body.

31. The method for manufacturing a honeycomb structure according to claim 29,
wherein
said cutting is milling, planing, or end milling.

32. The method for manufacturing a honeycomb structure according to claim 17, the method further comprising
drying and solidifying said paste for an adhesive layer to form an adhesive layer.

33. The method for manufacturing a honeycomb structure according to claim 17, the method further comprising
processing side faces of said ceramic block into a predetermined shape.

* * * * *